(12) United States Patent
Lakayev et al.

(10) Patent No.: US 6,298,350 B1
(45) Date of Patent: Oct. 2, 2001

(54) METHOD FOR AUTOMATIC PROCESSING OF INFORMATION MATERIALS FOR CUSTOMISED USE

(75) Inventors: Anatoliy Semenovich Lakayev; Vasiliy Nikolayevich Ivanov; Igor Mikhailovich Kornev; Vitaliy Anatolyevich Yakovenko; Marina Alekseevna Bevz, all of Moscow (RU)

(73) Assignee: Gosudar-Stvenny Nauchno-Tekhnichesky Tsentr Giperinformatsionnykh Tekhnology (GNTTS "GINTEKH"), Moscow (RU)

( * ) Notice: Subject to any disclaimer, the term of this patent is extended or adjusted under 35 U.S.C. 154(b) by 0 days.

(21) Appl. No.: 09/171,954
(22) PCT Filed: Apr. 29, 1996
(86) PCT No.: PCT/RU96/00101
  § 371 Date: Oct. 29, 1998
  § 102(e) Date: Oct. 29, 1998
(87) PCT Pub. No.: WO97/41519
  PCT Pub. Date: Nov. 6, 1997

(30) Foreign Application Priority Data

Jun. 13, 1996 (RU) ............................................. 96 111 926

(51) Int. Cl.[7] ........................... G06F 17/30; G06T 11/00; G06T 11/20
(52) U.S. Cl. ................................. 707/100; 707/3; 707/4; 707/5
(58) Field of Search ..................................... 345/440, 433; 707/100, 3, 4, 5

(56) References Cited

U.S. PATENT DOCUMENTS

| | | | |
|---|---|---|---|
| 4,953,106 | * | 8/1990 | Gansner et al. ..................... 345/400 |
| 5,280,619 | * | 1/1994 | Wang ................... 710/200 |
| 5,748,844 | * | 5/1998 | Marks ................................... 706/45 |
| 5,768,578 | * | 6/1998 | Kirk et al. ............................ 707/100 |
| 5,806,062 | * | 9/1998 | Chen et al. ............................... 707/4 |

OTHER PUBLICATIONS

Robert B. Allen, "User models: theory, method, and practice," in *Int. J. Man—Machine Studies* (1990) 32, 511–43.
Scott Deerwester, Susan T. Dumais, George W. Furnas, Thomas K. Landauer, and Richard Harshman, "Indexing by Latent Semantic Analsys," *Journal of the American Society for Information Service* 41(6):391–407, 1990.

* cited by examiner

*Primary Examiner*—Thomas Black
*Assistant Examiner*—Frantz Coby
(74) *Attorney, Agent, or Firm*—Lackenbach Siegel Marzullo Aronson & Greenspan, P.C.

(57) ABSTRACT

Inventions relating to the field of information technologies provide an appropriate account of "user's profile", i.e. user's information need, and supply a user with data about the content of the whole complex of processed information materials in a integrated form with a quantitative evaluation of relative covering, in processed materials, various components of "user's profile" both separately and in relations thereof.

The presence of data in materials being processed relating to elements of "user's profile" is detected and these data are demonstrated in visual or audiovisual forms local structures, i.e. graphs reflecting a character of relationship of each independent sense fragment of materials being processed with the mentioned elements, are generated.

Some from the suggested methods provide a user with the statistics, in visual form, on the frequency of using of various particular local structures and structures with different number of elements of "user's profile" included therein.

In other embodiments, an integrated graph presenting a logical sum of local structures is generated with demonstrating an image of this graph for a user, as a whole or by separate components. In all embodiments, the final result of the method directs a user on a priority selection of those parts of information materials which meet his information need in the most grade as well as helps to discover latent problems not appearing acquaintance with material 6 independent claims.

6 Claims, 8 Drawing Sheets

METHOD FOR AUTOMATIC PROCESSING OF INFORMATION MATERIALS FOR CUSTOMISED USE

FIELD OF THE INVENTIONS

The suggested inventions relate to information technologies exactly to processing information materials to prepare them for personified use that is to the processing oriented on a particular user or a group of users having definite, supposed as known, needs in information.

THE BACKGROUND ART

There are wide known traditional methods for processing information which is contained in materials' flow to prepare thereof for using by definite customers including methods for producing abstracts and summaries as secondary materials which characterize or present shortly contents of primary materials.

Such methods not suggesting any formalized principals for evaluating the content of primary materials have drawbacks due to human factor in individual approaches of specialists affecting on the processing and correspondingly on results.

There are also known methods for processing information in materials' flow by listing preselected hint words and producing an abstract of the document by juxtaposing extracted sentences containing such words. (See as an example European Patent application 0 361464 A2 with date of publication 04.04.90.)

In similar methods there is more probable, than in the methods of the previous group, the selection of only that information which is connected with the information needs of the user defined by a list of reserved words. However, missings of wanted information and false hits are possible since words can have more than one meaning and the same meaning can be expressed by different wordings.

Moreover, a number of methods is known which are grouped by directing on detecting a "latent structure" of information being interesting for the user on the base of an analysis of his previous demands. (See as an example Scott Deerwester et al., "Indexing by Latent Semantic Analysis", Journal of the American Society for Information Science, 41(6), p. 391–407, September 1990.)

In these methods which are also oriented on detecting coincidences of search images with elements of the processed materials' content due to more complicated composing of the indicated images forming so called "user's profile"; i.e. his information needs' characteristic, errors, inherent in methods of the previous group, are less probable.

However, in this and similar methods, the stress is made on forming "user's profile" making this in advance and not paying attention to obtaining an integrated presentation of the processed materials' content as well as to the content of one multiaspect document of great volume during processing itself since such methods including methods of the previous group are oriented on an independent analysis of separate materials of the processed flow. Moreover, although the noted stress creates some background for automation of such methods it is not favorable for full activating abilities of specialists dealing with "hand" processing the flow of information materials.

THE DISCLOSURE OF INVENTION

The claimed inventions are presented by six methods-embodiments for processing information materials for personified use.

The most close to all claimed methods is the last method above described by S. Deerwester et al.

Each of the claimed methods solves the task to obtain a technical result concluded in activating psychophysical means affecting (stimulating) associative (interpretive) abilities of a specialist dealing with processing information materials' flow, on an appropriate consideration of user's information needs to create conditions for personified information support. The technical result achieved using the present methods is concluded also in providing to a user the content of the whole complex of the processed information materials in the integrated form with a quantitative evaluation of relative covering, in processed materials, various components of "user's profile" both separately and in relation with a conclusion of sequenced quantitative characteristics of a suggested integrated form that permits to determine a sequence of acquaintance with information materials by a specialist himself in accordance with his information needs.

To achieve the called technical result in each of three first embodiments as well as in the mentioned known method, it is necessary to detect the presence of data in the processed materials which can be described on their content by elements of the characteristic of user's information needs ("user's profile"), to fix the presence of such data and corresponding thereto elements of the characteristic of "user's profile", and to use these elements and combinations thereof in providing the content of the processed materials to the user.

In contrast with the known method in the first, second and third suggested methods, the processing is performed in an interactive mode with demonstrating sequently separate sense fragments on which information materials being processed are subdivided, in a form corresponding to types of the fragments, with demonstrating the elements of the characteristic of "user's profile" in visual or audiovisual forms.

In case of detection of sense relationship between the content of a definite fragment and some or other from the mentioned elements, the presence of such a relationship is fixed by generating an individual feature for each of the elements with which the relationship is detected.

Further, in the first suggested method with detecting different order relationship of the given fragment with different elements of the characteristic of "user's profile", the features of relation of these elements to different tiers should be generated in accordance with the number of the detected grades of the relationship. After that, an image of local structure, i.e. a structure relating to the given fragment of the structure, is being formed and representing a marked connected undirected graph, to nodes of which elements of the characteristic of "user's profile", for which the features of the presence of relations with the content of the given fragment were formed, are put in accordance.

This graph will be fully connected, if no one of the mentioned elements of the characteristic of "user's profile" is dominating that is all of them are considered as of the same tier. If features indicating that elements of the characteristic of "user's profile" belong to different tiers in accordance with detected differences in the density of their relationship with the content of the given fragment, in such a case, each of higher nodes is connected with all lower ones. Moreover, in case of the presence more than one node at the highest tier, each of such nodes is also connected with others and with the same tier.

According to the second suggested method after fixing the presence of the mentioned relationship and forming an individual feature for each of elements of the characteristic of "user's profile" with which the relationship of the content of the given fragment is detected, the demonstration of structures of the connected undirected graph from a fixed set of versions is being performed in visual or audiovisual forms. To nodes of the graph, elements of the characteristic of "user's profile", for which the features of the presence of relations with the content of the given fragment were formed, are put in accordance. At least one structure of the set is characterized by the presence of a dominating element. Here, as a local structure, i.e. relating to the given fragment, one from the set which is most fitted to this fragment is selected, and as features of the selected structure, the collection of material factors identifying elements of the characteristic of "user's profile" corresponding nodes of this structure and the presence of edges connecting thereof are fixed.

According to the third suggested method after fixing the presence of the mentioned relationship and forming an individual feature for each element of the characteristic of "user's profile", with the presence of relationship of the content of the given fragment was detected, an image of a local structure is being formed, i.e. a structure relating to the given fragment in a form of a marked connected undirected graph for nodes of which elements of the characteristic of "user's profile" are accorded, i.e. elements for which the features of the presence of the relationship with the content of the given fragment and, as the features of the formed structure, the collection of material factors is fixed, i.e. factor identifying elements of the characteristic of "user's profile" corresponding the nodes of this structure and the presence edges connecting thereof.

After completing to form the image of the local structure for the last fragment of materials being processed in each from the three suggested methods, an image of an integrated graph is generated by logical addition of graphs presenting local structures with equal multiple edges. Then the result of processing is reflected in a visual form with changing the multiple edges by geometrical images sizes and color of which correspond the multiplicity thereof and by digital indication of the multiplicity of edges of the obtained integrated graph, in a whole or separate components thereof, as an indicator of a grade of problems' mutual relationship matching up for elements of the characteristic of "user's profile" to which the nodes of the integrated graph correspond.

The described three suggested method are equal from a view of achieving the above technical result. The first method is preferable in cases when the character of information materials being processed permits to operate only with two kinds of local structures therein. The second method—in case when expected local structures can have another form, known in advance, particularly when they are more than two. The third one—when the particularity of information materials being processed do not permit to select typical local structures a priori.

The fourth, fifth and sixth suggested methods as well as the first three methods are common with the known method described by S. Deerwester et al. in detecting the presence of data in material being processed which can be described, from a view of their content, by elements of the characteristic of "user's profile", in fixing the presence of such data and elements of the characteristic of "user's profile" corresponding thereto, and in using these elements and combinations thereof when providing the content of materials being processed to the user.

Contrary to the known method, the processing in the fourth, fifth and sixth suggested methods is conducted in an interactive mode. Besides, it is provided to demonstrate sequently separate sense fragments on which information materials being processed are subdivided in a form corresponding to their kind together with the demonstration of elements of the characteristic of "user's profile" in visual or audiovisual forms. In case of detecting the sense relationship between the content of a given fragment and ones or others from the mentioned elements, the presence of such a relationship is being fixed by generating an individual feature for each element with which the relationship of the given fragment has been detected.

Further, according to the fourth suggested method under detecting a different grade relationship of a given fragment with different elements of the characteristic of "user's profile", features indicating different tiers of these elements in accordance with a number of detected grades of relationship are being generated. After, an image of a local structure, i.e. a structure relating to a given fragment, is being generated, this image is presented by a marked connected undirected graph to nodes of which elements of the characteristic of "user's profile" for which features of relationship with the content of a given fragment were generated, are put in accordance. This graph is a fully connected one if none of the mentioned elements of the characteristic of "user's profile" is a dominating one. In case of generation of features indicating that elements of the characteristic of "user's profile" belong to different tiers in accordance with detected differences in the density of their relationship with the content of the given fragment, each from higher nodes is linked with all lower ones. In case of the presence of more than one node at the highest tier, each from such nodes is linked also with the rest nodes.

According to the fifth suggested method after fixing the presence of the mentioned relationship and generating an individual features for each element of the characteristic of "user's profile" with which the presence of relationship with the content of the given fragment was detected, the demonstration (in visual or audiovisual forms) of structures of the connected undirected graph from the fixed set of versions to nodes of which elements of the characteristic of "user's profile" for which features of the presence of the relationship with the content of the given fragment were generated, put in accordance, at least one structure of the set has its own distinctive feature, i.e. the presence of a dominating element.

Here, there takes place the selection of a local structure, i.e. relating to a given fragment, from available in the set and of such a form which is the most adequate to this fragment. The fixation of material factors' aggregate, as features of the selected structure, identifying elements of the characteristic of "user's profile", corresponding to the nodes of this structure and the presence of edges connecting them is being performed.

In the sixth suggested method after the fixation of the presence of the mentioned relationship and after the generation an individual feature for each element of the characteristic of "user's profile" with which the relationship is detected, operations should be performed as follows:

to generate an image of the local structure, i.e. relating to the given fragment of the structure, in a form of a marked connected undirected graph to nodes of which elements of the characteristic of "user's profile" are put in accordance for which features of the presence of the relationship with the content of the given fragment are generated;

and to fix, as features of the generated structure, the aggregate of material factors identifying elements of the characteristic of "user's profile" corresponding to the nodes of this structure;

and the presence of edges connecting them.

Then, in the fourth, fifth and sixth suggested methods, we define frequencies of occurrence of various particular local structures as well as frequencies of occurrence of local structures with different number of elements of the characteristic of user's information need included therein (elements in the mentioned local structures) and reflect values of these frequencies and forms of the corresponding local structures.

The same information can be reflected as an intermediate result of processing in the first three suggested method.

Both the first three suggested methods and the following three methods being equal in possibility to obtain the above mentioned technical result are preferable in the same cases which have been indicated for the first three methods.

The activating of psychophysical abilities for orienting a specialist who processes information materials' flow on the adequate consideration of user's information needs is supported by the interactive mode in all six suggested methods that means the performing (by this specialist) all prescribed actions in response to actions which being mode automatically on the visual or audiovisual presentation of primary materials and current results of the processing.

The providing of the content of the whole totality of processed information materials in an integrated form to the user is supported both by organizing the processing in the interactive mode and by the fact that the generated and represented results of the processing in a form of quantitative values is a function of the content of the whole totality of processed materials being considered from a point of view of "user's profile".

Both the reflected results of the processing concluded in an integrated graph with its components according to the first three methods and results of the statistical analysis of occurrence of one or other elements of the characteristic of "user's profile" in local structures of different types according the fourth, fifth and sixth methods have such a character.

THE PREFERABLE EMBODIMENTS

Figure 1:
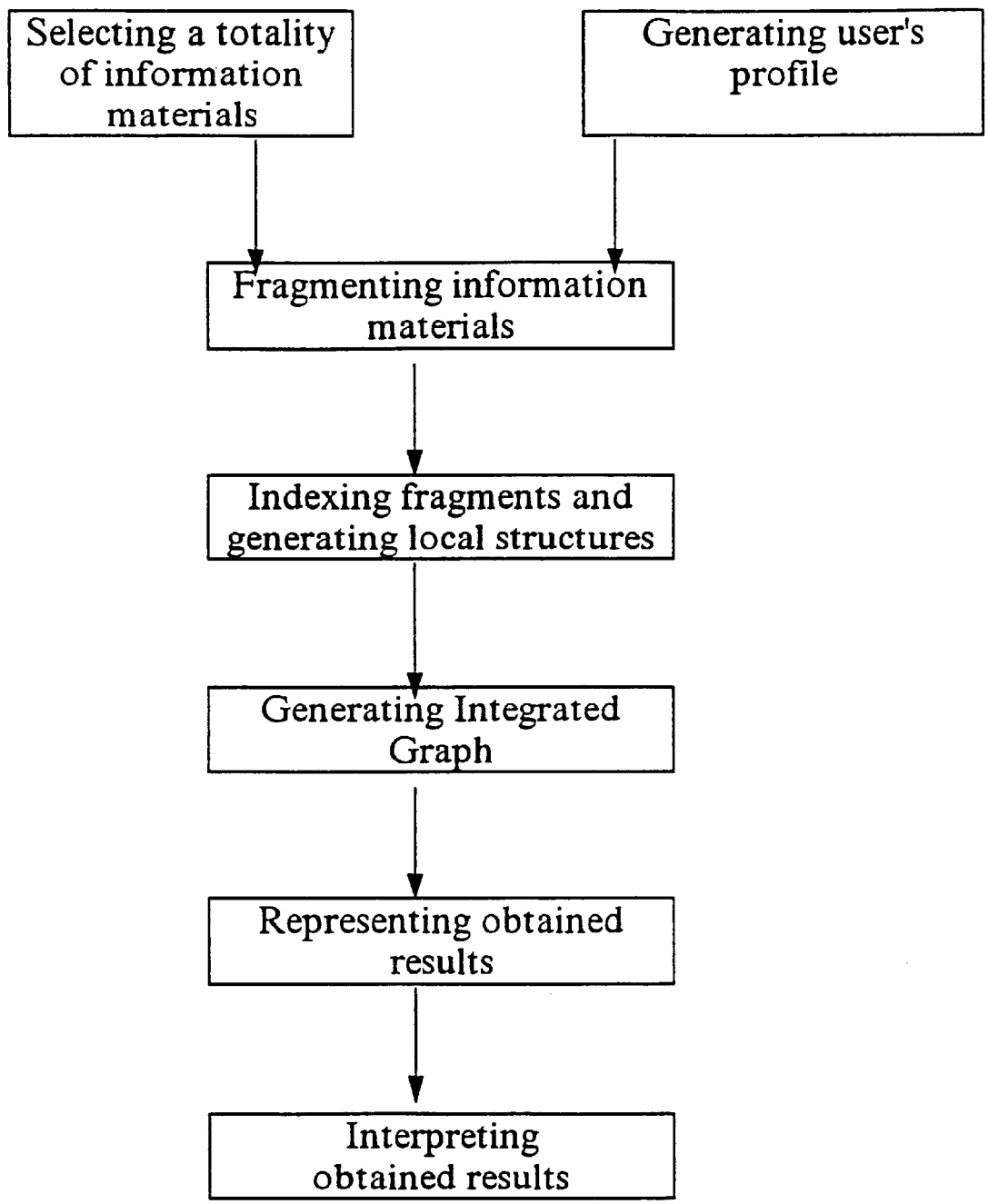
FIG. 1 is a block diagram of the technology for processing information materials automatically for the personified use.

The information technology based on any of the suggested methods including the use of results thereof and previous preparative operations is shown in FIG. 1.

The preparative operations include the generating of "user's profile", the selecting of information materials and the fragmenting thereof.

The methods, as they are, include the indexing of information materials (including the comparing of information materials' fragments with predetermined types of local structures according to the first, second, fourth and fifth methods) or the generating of local structures (the third and sixth methods) and of an integrated graph (only in the first three methods) as well as the representation of obtained results.

Actions on the use of obtained results include the interpreting thereof.

The suggested methods do not demand special forms of information materials and carriers thereof. The methods permit the use of any documentation materials. These materials can include text materials, videomaterials and others.

"User's profile" is an aggregate of sense elements characterizing the user's information need. Depending on information need, these elements can include concepts, definitions, problems, tasks, indexes, objects or, as general case, terms (words or word combinations) or term combinations (sentence or several sentences). When determining "user's profile", relations between elements thereof are not being set. Various known methods for generating "user's profile" are discussed for example by Allen (Allen, R. User models: theory, method and practice international. Journal of Man-Machine Studies, 32 (1990), pp. 511–543).

In the use of the suggested methods, it is essential that elements must be approximately of one level of importance from a view of user's interest and have an equal nature (be near one to another in designation, type). Elements of "user's profile" can be represented not only in form of wordings but in form of visual images.

The fragmenting information materials should be understood as separating them into separate semantic modules. For such a type of materials as messages, the fragmenting means the separating of significant messages and fragment can be a message itself or a part thereof. For such a type as documents, a fragment can be in form of a paragraph.

The indexing means the juxtaposition of the sense of "user's profile" and prescription thereto one or other elements. When indexing, it should be set to what definite type a character of relationship between elements juxtaposed therewith belongs and the type to be described by a graph— by a local structure. For the first and the fourth methods, this is a hierarchy structure either a structure represented by a full connected graph, in the second and fifth methods—a structure from a number of structures of precomposed set thereof ("library" of structures), in the third and sixth methods—a structure of any form being set by a specialist performing the indexing.

The selecting of one or another structure is defined by associations of a specialist making he indexing when comparing a sense of a fragment and a totality of elements of the characteristic of "user's profile". Dominating elements, the presence of which define the hierarchical nature of a local structure being selected, are defined by a sense of a fragment relative to the information need of the user as more important (having a priority) n comparison with others for this fragment. A local structure obtained from indexing is a totality of sense elements of "user's profile" and logical relations between them.

An integrated graph should be understood as a logic sum of all local structures obtained during indexing. They are marked undirected connected graphs with the same multiplicity of edges. A logic sum of local structures is obtained by superimposing thereof with matching similar nodes (definite elements of the characteristic of "user's profile" are associated with nodes). The multiplicity of edges of an integrated graph is equal to a number of coincided relations between corresponding pairs of nodes in local structures being summated.

Results of the processing of information materials are represented in form of text fragments, plots, diagrams, tables.

The interpretation of results obtained after processing is the last stage of information technology performed by the suggested methods. The interpretation detects, inter alia, complexes of closely-related elements defining "user's profile", single loosely-related elements or unrelated elements with others. The further qualitative and quantitative analyses permit to make conclusions about the correspondence of processed materials to the information need of the user and the information saturation of these materials from the view of the given "user's profile".

Performing all the processing from a position of a given "user's profile" defines the technology being described as the technology of the processing of information, materials for the personified use.

Figure 2:
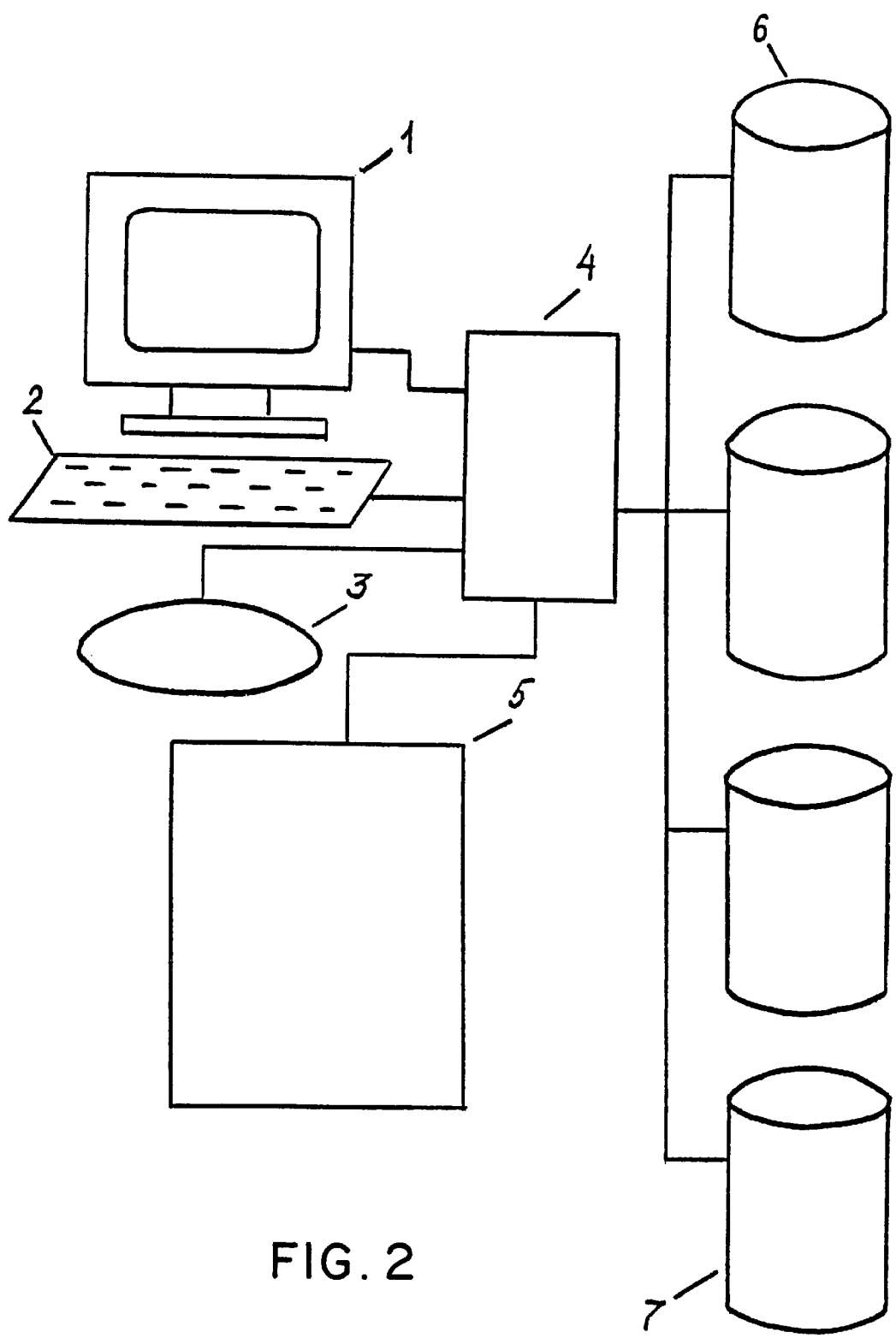
FIG. 2 is an example of technical means for one embodiment of the technology for processing information materials automatically according to the suggested methods.

An approximate set of technical means for performing the suggested methods as shown by a diagram in FIG. 2 includes a computer monitor (or monitors) 1 with a keyboard 2 and a pointing device ("mouse") 3, a processor 4, a memory 5 of programs, intermediate and final results of processing, carriers 6, 7 of information materials' files being processed and elements of the characteristic of "user's profile".

When using such a set of technical means on the stage of indexing, one display field of the monitor or one of the monitors, if there are several monitors, represents the content of primary materials separating each fragment by distinctive lighting which differs from neighbour lighting. It is possible to look through images corresponding to elements of "user's profile" in another display field or on another monitor at the mode of scrolling.

In another one interactive display field or in the same field where elements of "user's profile" are represented or on a display of a separate monitor, images of radio buttons are lighted selecting which by means of a keyboard or by a graphics manipulator you can generate features of the presence of a sense relationship between a fragment being indexed and ones or other elements of "user's profile" being represented.

In similar way depending on a method being used, local structures are represented and the selection of them is performed or, for the third and sixth suggested methods, a form of a structure is generated.

The completing stages of the methods represent results of the statistic analysis of frequencies for using elements of the characteristic of "user's profile" being the dominating ones in local structures together with information about corresponding elements themselves and about those fragments of primary materials for which the presence of relationship of the content with corresponding elements of "user's profile" has been detected.

Figure 3:
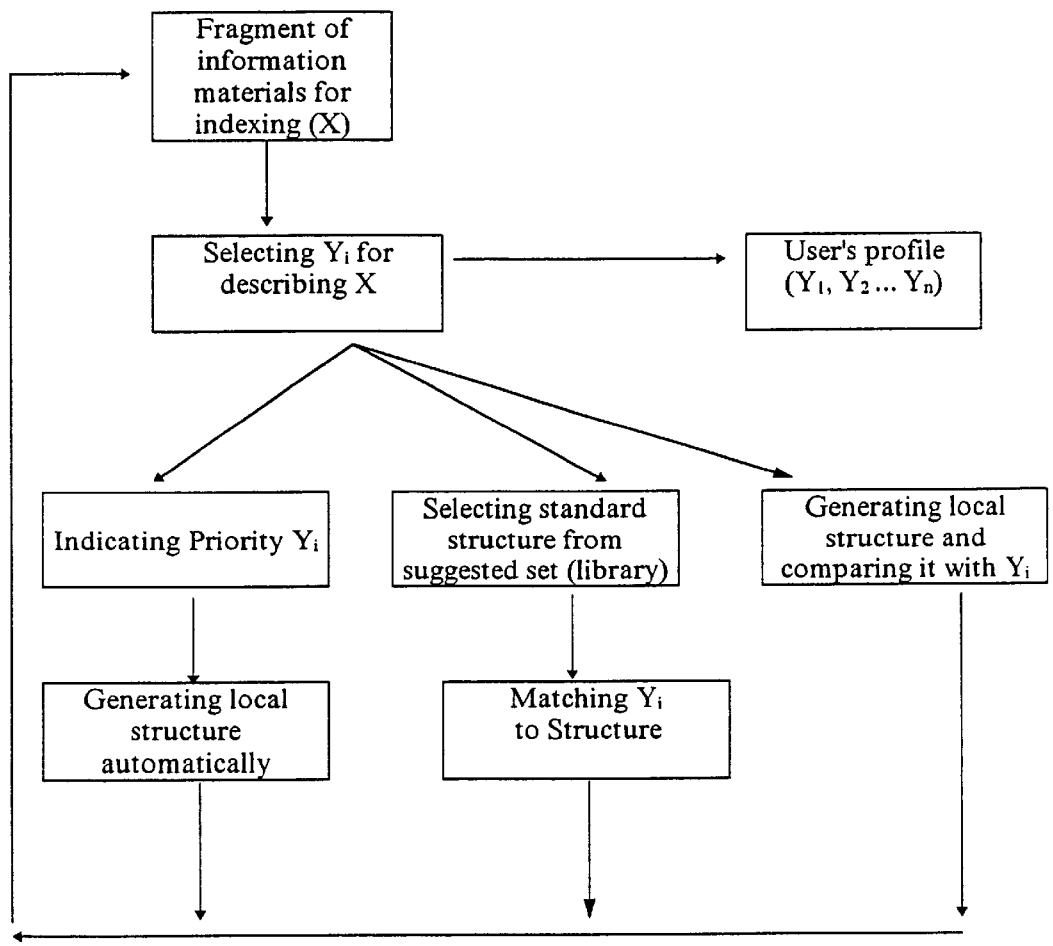
FIG. 3 is a diagrammatic illustration of generation of an image of a local structure being prescribed to a fragment of the information materials.

The process of the indexing, i.e. generating an image of a local structure prescribed to a fragment of information materials, is shown in more details in FIG. 3 where a symbol "X" for a fragment of information material being processed and a symbol "$Y_i$" for components of "user's profile" are used. The diagram in FIG. 3 is schematic in that it illustrates simultaneously all three methods of the indexing used in the first and fourth methods (two low blocks on the left), in the second and fifth method (two low blocks at the middle) and in the third and sixth methods (a lower block on the right) correspondingly.

Figure 4:
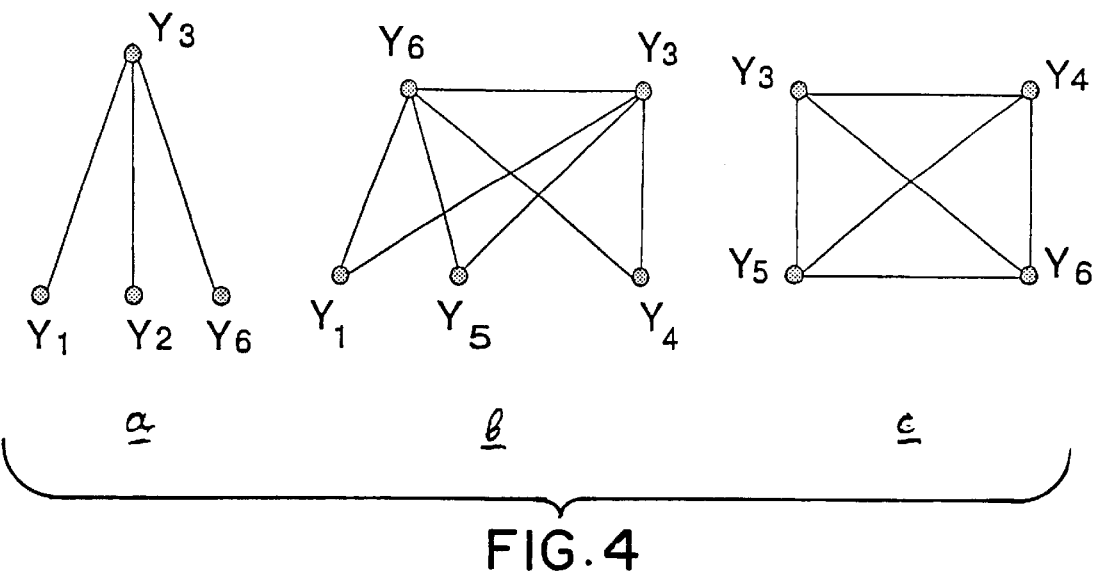
FIG. 4 are examples of local structures having nodes which correspond to dominating elements of the characteristic of "user's profile" and to a fully connected local structure.

Forms of local structures used in the first and fourth methods are explained by FIGS. 4$a,b,c$ which show a simplest hierarchical structure with dominating node $Y_3$, a hierarchical structure with two nodes $Y_6$ and $Y_3$ at the high tier and a full connected structure correspondingly. The generating of an integrated graph is explained by FIG. 5 on the base of particular graphs of local structures of FIG. 3 (multiplicities of edges) are shown by digits. Such a principal of the generating of an integrated graph is used in the all suggested methods.

Figure 6:
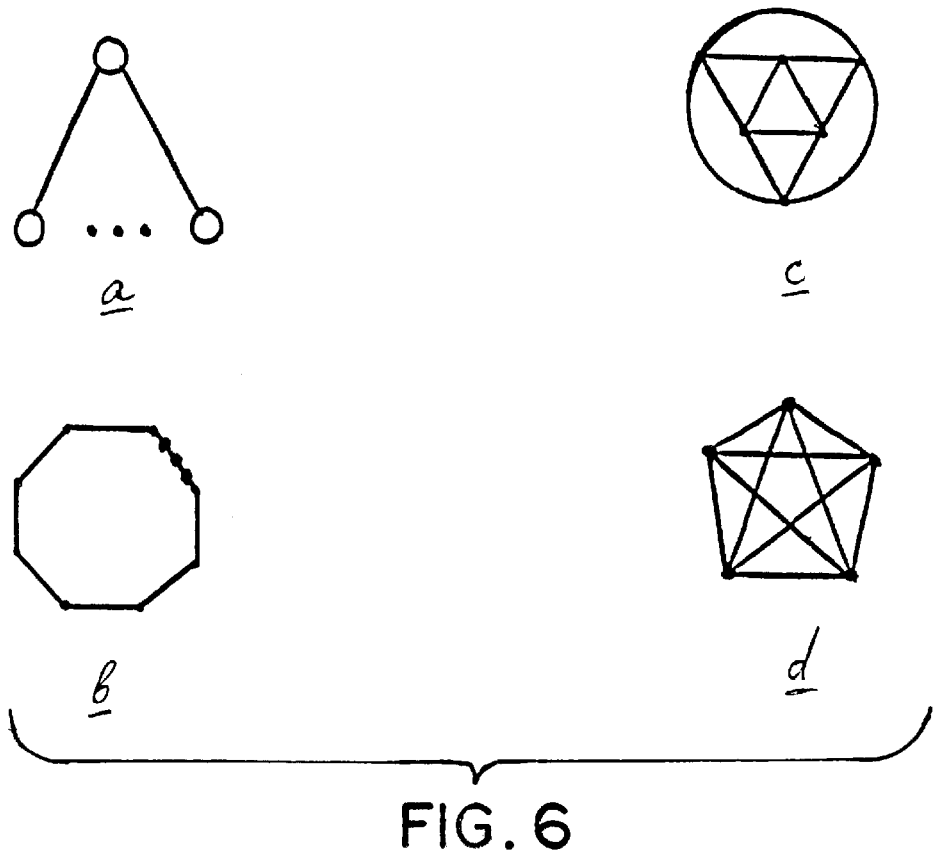
FIG. 6 is an example of a set of local structures.

An example of a collection ("library") from base local structures for use in the second and fifth method is illustrated in FIGS. 6$a$–$d$ which show correspondingly:

a structure with a leader (a dominating element of "user's profile") which is similar to FIG. 3$a$ and is applicable for any number of nodes $Y_i$, nodes which are not leaders form an environment for a leader;

a structure of ring type in which only neighbour nodes are linked in pairs being also applicable for any number of $Y_i$ is a structure with loosely-coupled interface;

a regular structure in which all nodes are equal being applicable for a number of $Y_i$ multiple of 3 refers to structures with average coupling;

a fully-coupled structure in which each $Y_i$ is coupled with others is a structure with closely-coupled interface.

Figure 7:
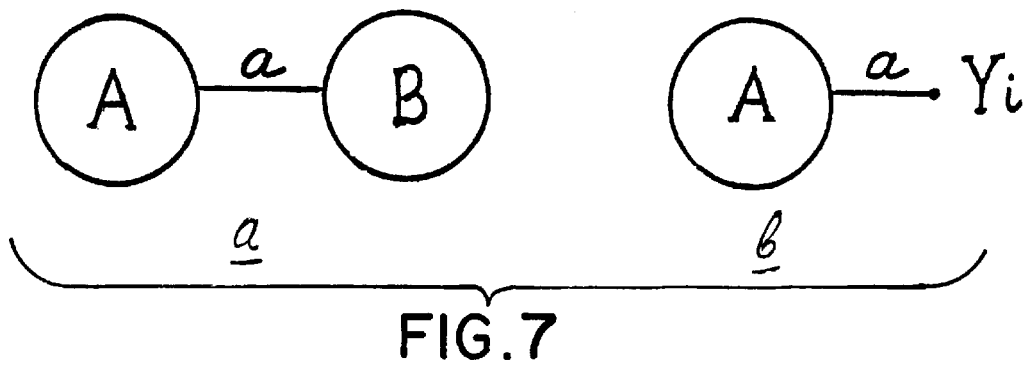
FIG. 7 is an example of structures which can be included in the set additionally.

Additionally, structures of such types as shown in FIGS. 7$a,b$ may be included in the collection.

Figure 5:
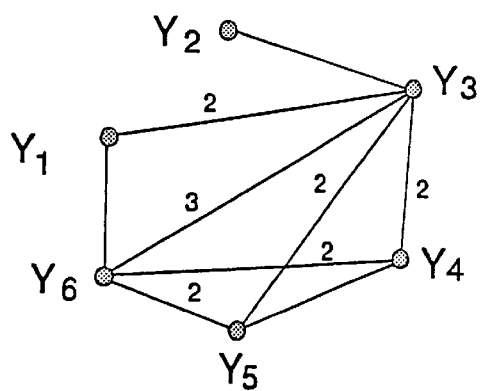
FIG. 5 is an example of generating an integrated graph for the totality of local structures of FIG. 4.

FIG. 7 shows a structure of "dumb-belis" type in which A and B are local structures from a number of base structures shown in FIG. 5. In a particular case, A and B can be the same structure. The presence of an edge connecting two base structures reflecting independent subject groups of notions is essential for this structure. An edge between A and B means the presence of relationship between any pair of notions one of which is included into A and another into B.

A designates also one of base local structures in the structure of FIG. 7$b$. Edge "a" designates a relationship between $Y_i$ and any notion included in A.

Moreover, the library may include types of local structures which are generated recursively when one from base local structures is a separate notion.

In the third and sixth methods, a specialist performing the indexing can prescribe to a separate fragment being processed an arbitrary graph as a local structure, in particular such a graph which is generated from one of base structures by including or discluding separate edges.

The fourth, fifth and sixth methods, on the designation thereof, can be compared with methods for producing abstracts which are applicable for the characteristic of information materials' content.

Usual methods do not provide the generating of recommendations for the user about appropriate sequence of acquaintance with subjects in which the user is interested.

The expediency, in this case should be understood as saving the time suggesting to the user not to acquaint with materials in series as hey appeared but at first with those materials which are the most corresponding to his interests.

The utility relating to making abstracts (indexing) of a local structure has both the microeffect and the macroeffect. The microeffect is concluded in saving time simultaneously with obtaining more information by the user when seeing a separate local structure prescribed to some material on a display. In case of usual producing abstracts, the user must read words of an abstract sequently, a word by a word. In case of providing to the user an abstract in form of a local structure, the user catches all elements of this structure at once simultaneously with a character of relationship between them. There is no hard sequence of acquaintance. If there are many $Y_3$, for example more than a hundred, the first word from Y for each node is lighted sequently on a display to accelerate the orientation of the user in a local structure, then 2 words and so on. Here, human psychophysical abilities to understand at once, that is to catch a type of a structure which being seen.

The macroeffect is achieved when the user is provided with total information about all local structures by means of which abstracts of materials, interesting for the user, are made. The user is provided with the output of logical statistics on a frequency of use of separate notions or combinations thereof as a leader as well as combinations of $Y_i$ which were put into closely-coupled local structures (type 4). As the result, the user has chance to generate a strategy of acquaintance with materials based in whole on information which is output to him. Taking into consideration that data output to him are oriented on describing the most essential and important information, the user has chance to reduce time of acquaintance with materials in whole.

As mentioned above, data which can be represented as results being provided to the user are the same both for the first three methods and for methods 4–6. However, such results are intermediate in the first three methods but the main result for them is a result in form of information included in an integrated graph.

In is essential for analyzing information included in an integrated graph to provide means for detecting and attracting the attention of the user to structure features of an integrated graph. Such features may include so called "logical bunches" of elements' combination of "user's profile" which are the most frequent in different local structures. For detecting them, the user is provided by output of elements' combination in "user's profile" ordered on a sum of relationships, accounting a multiplicity between elements included in a combination (back-end couplings), and a sum of relationships, accounting a multiplicity between included in a combination with all others (front-end couplings). The detected "bunches" may be interpreted as complexes of elements "containing the base content" of information materials as a new problem, not yet realized by the user, and having a relation to his information need.

The use of the suggested methods as noted above, is performed in the interactive mode supposing the representation of current and summarized information represented in different forms.

The output form presents a totality of visual objects on a screen of a personal computer's monitor.

The output forms differ by their designation and by included components.

The components are divided into:
1) supporting communication with the system:
   menu (text menu and pictures);
   information systems of assistance (names of windows, status lines, additional information), helps;
2) presenting results of the processing of information to the user and affecting on the demonstration of them.

An important feature of the output form is its organization directed so that a totality of components should provide the multiaspect and commented representation on a particular task to which the output form is related.

In other words, each output form is related to a particular task which determines the character of selection of components, methods of representation thereof and processing.

According to their designation, output forms are divided into:
   supporting a technological process;
   providing reference information;
   representing results of the processing of information and affecting on demonstration thereof (set by the user).

The support of two methods of the processing of obtained results by an interface is supposed as follows:
   on a standard scheme;
   optional.

The both methods suppose the use of specified output forms.

The practical use of the technology based on the suggested inventions is illustrated by an example below.

The example is the processing of information materials obtained from "Project program of UNESCO and the budget of 1996–1997. Document 28 (C5, UNESCO publication, 1995" (in Russian).

19 information materials (text fragments) were separated for indexing. "User's profile" describing a user's information need relating to "Project program UNESCO" was generated for indexing the materials.

The profile includes 9 elements:

1. Broadening local possibilities of education including press, radio, TV, libraries, multimedia.

2. Renovating and deverification of the education system taking into account needs of culture originality of learners.

3. Promotion of efforts to find alternative systems of education including open and remote.

4. Accelerating the transfer and dissemination of knowledge through existing nets and exchange of data bases.

5. Preservation and protection of the world heritage of the humanity in forms of books, works of art and monuments of historical and scientific importance.

6. Modernization of museum infrastructures and improving educational programs with the purpose to use museums as places of continuous education.

7. Promoting so that technological innovations should meet needs of the developing of the production, dissemination of various and qualitative culture programs and other culture production.

8. Enhancing efforts on development of regional computer nets which can become the first step to creating "electronic fast highways" for developing countries.

9. Promoting the use of information and communication technologies in all fields of UNESCO competence.

Elements of user's profile were accorded with fragments of "Program" during indexing. As an example of indexing, three fragments of text with elements accorded to them (a number—an order number of an index, symbol "*"—an indication of higher priority for an element of user's profile relative to other elements prescribed to a fragment) are given.

Fragment 1.

Project 01224 from "Large program 1". On the way to continuous education.

In the frames of International project on technical and professional education (UNEVOC) which was started in 1992, efforts on creating the net of national centers of UNEVOC with purposes to activate an exchange of experience on questions of the policy in the field of technical and professional education, strengthening a national potential in the field of research and development, promoting access to data bases and information will continue as earlier. The stress will be made on measures for training personnel in such fields as preparing training plans and methods of training, training teachers, administrators, planners (with participation of UNESCO MIPO) as well as on preparing materials on methods of teaching. In connection with Project "Natural scientific, technical and professional education for girls and women", the attention will be paid on promoting the equal access to the technical and professional education for girls and women and cooperation between the education system and the labour market in perspective of continuous education (with participation of UNESCO IBP). The edition of quarterly information bulletin UNESCO INFO in English and French is provided for.

Elements 2, 4, 9 are accorded to the fragment.

Fragment 2.

Project 03127 from "Large program III. Development of culture, heritage and creative work".

Special efforts will be made with the purpose to preserve culture movables and to improve museums' infrastructure. The assistance to states-members will be rendered relative to preparing lists, providing the preservation, the security and popularizing collections. In cooperation with ICCROM and ICOM, the attention will be attracted to training museum workers by strengthening or creating nets in other districts similar to net PREMA for African countries. The technical assistance will be rendered to developing countries with the purposes to create national museums as well as to provide them with computer systems and data bases (in cooperation with Agency on cultural and technical cooperation [ACCT] and [ALECSO]).

To the fragment, elements 5, *6, 9 are accorded.

Fragment 3.

Project 03127 from "Transdiscipline projects".

Training materials and information will be widely disseminated through government and nongovernment systems from the net of delivery such as for example, "Net Africa 2000", "Society Planet", clubs of UNESCO. The net of associated schools, organizations of youth and of women, social movements and organizations of teachers. The assistance in translating separate materials into national and local languages will be rendered. Agreements on cooperation will be concluded with organizations dealing with population and environment in different regions with the purposes to promote wide dissemination of available information being important for an appropriate audience.

Figure 8:
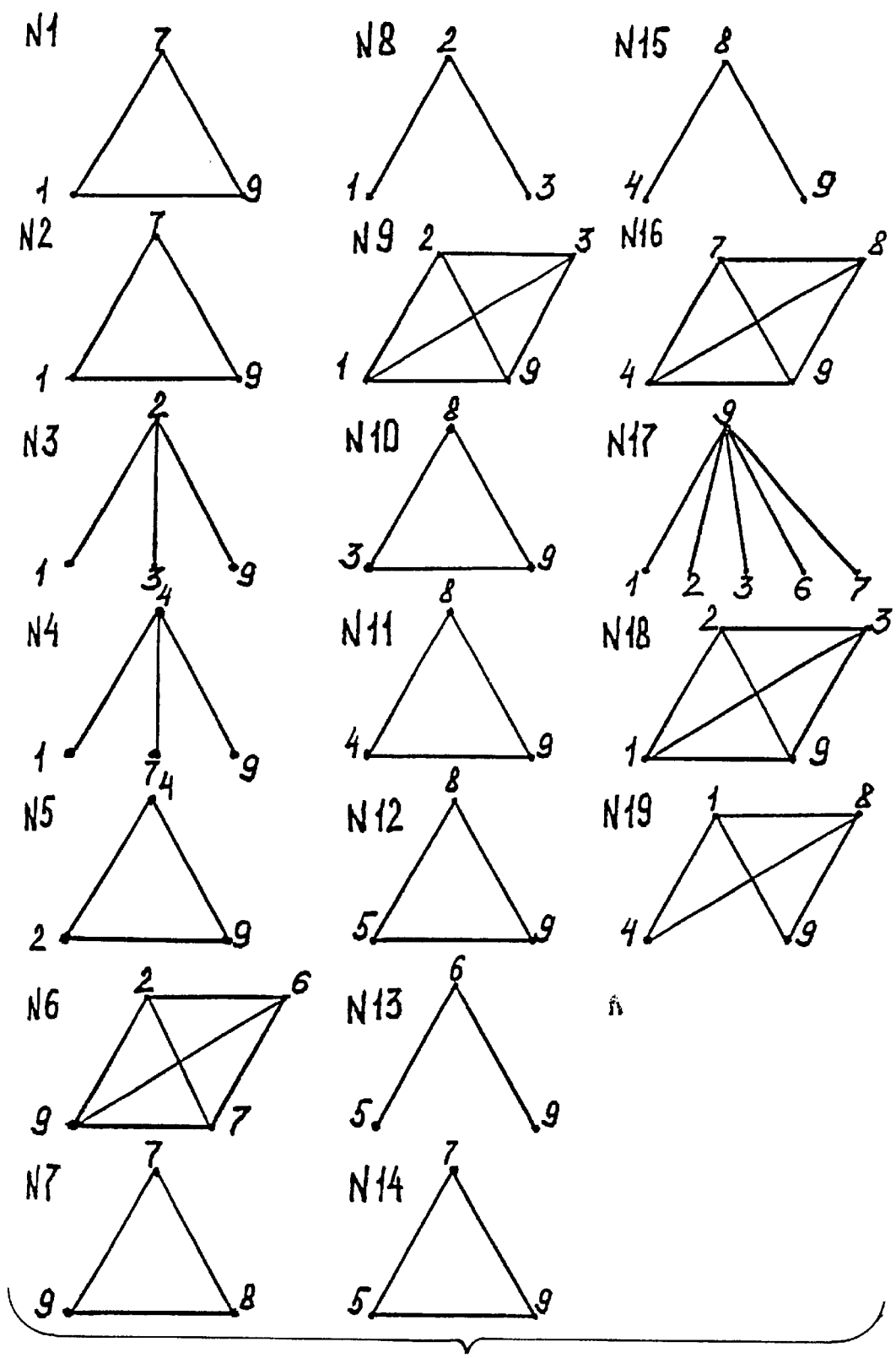
FIG. 8 is a totality of local structures generated under processing particular information materials.
Figure 9:
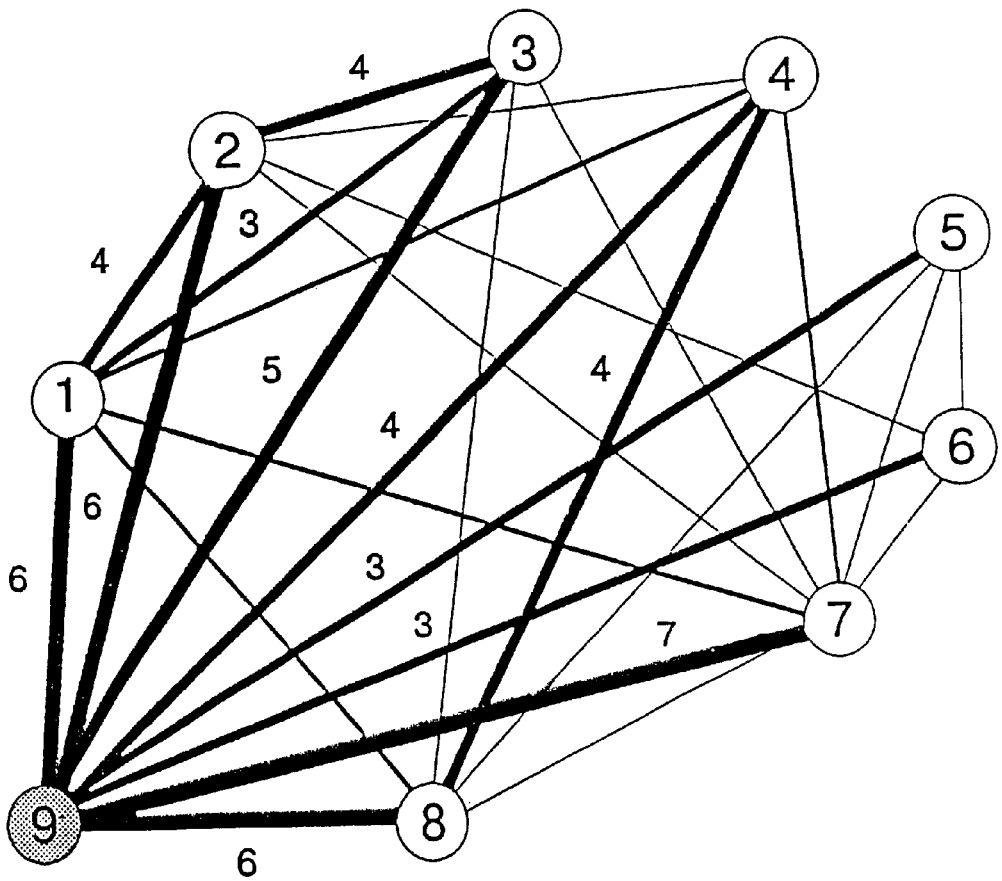
FIG. 9 is an integrated graph corresponding to the totality of local structures of FIG. 8.

To this fragment, elements *1, 4*8, 9 are accorded. Local structures corresponding to the fragments are shown in FIG. 8.

Because of the small number of fragments used for an example and nonrepresentive statistics on local structures, a statistic analysis on particular local structures is not considered. Further, an integrated graph (FIG. 8) was generated which was used as a base for evaluating and interpreting input information.

The analysis of multiplicity of edges of the integrated graph permits to determine the most closely—or loosely-coupled problems. We give, as an example, one option of the analysis.

At first, we consider the most closely-coupled relationships (edges of the greatest multiplicity) from all possible optional pairs of elements of user's profile. The first three pairs are separated for demonstrating an approach. They are 7-9, 1-9, 2-9. It should be underlined that the separating is performed by a program.

Now we shall realize a similar separation of all possible optional combinations by three nodes of the integrated graph that is we shall consider all possible subgraphs of the integrated graph with three nodes.

The separation is also performed by an instruction of the user automatically.

Considering a total value of multiplicity of edges of the obtained subgraphs, we can put them in the order of decreasing this value.

Let's consider the first three obtained subgraphs. They are 1-2-9, 1-7-9, 2-3-7.

Comparing results achieved for subgraphs of the integrated graph with two nodes and for subgraphs of the integrated graph with three nodes, we consider how the character of relationship of elements of user's profile is changed.

Let's consider subgraph 1-2-9. It is the first subgraph on total multiplicity of edges from subgraphs with three nodes. (Further we call them "three".) The subgraph represents a situation created in course of indexing and reflects the fact that problems 1, 2, 9 have occurred the most interrelated in the user's opinion for given information materials. The user can consider by means of a program what exact materials have served as a base for generating the given subgraph. Further, comparing the given subgraph with the subgraph with nodes 7 and 9 (a leader from subgraphs of the integrated graph with two nodes, the user can make the conclusion that element 7 did not participate in generating the biggest "three" although the subgraph with nodes 7 and 9 is a leader among subgraphs with two nodes. It is obvious that the given process is iterative and can be applied to subgraphs with different number of nodes the purpose of the given process is to give the user information discovering in what way elements user's profile are used in indexing and what relations are generated between them on results of the indexing.

Iteratively evaluating the resulted relationships, the user obtains the characteristic of information materials applying to user's profile got under indexing.

Figure 10:
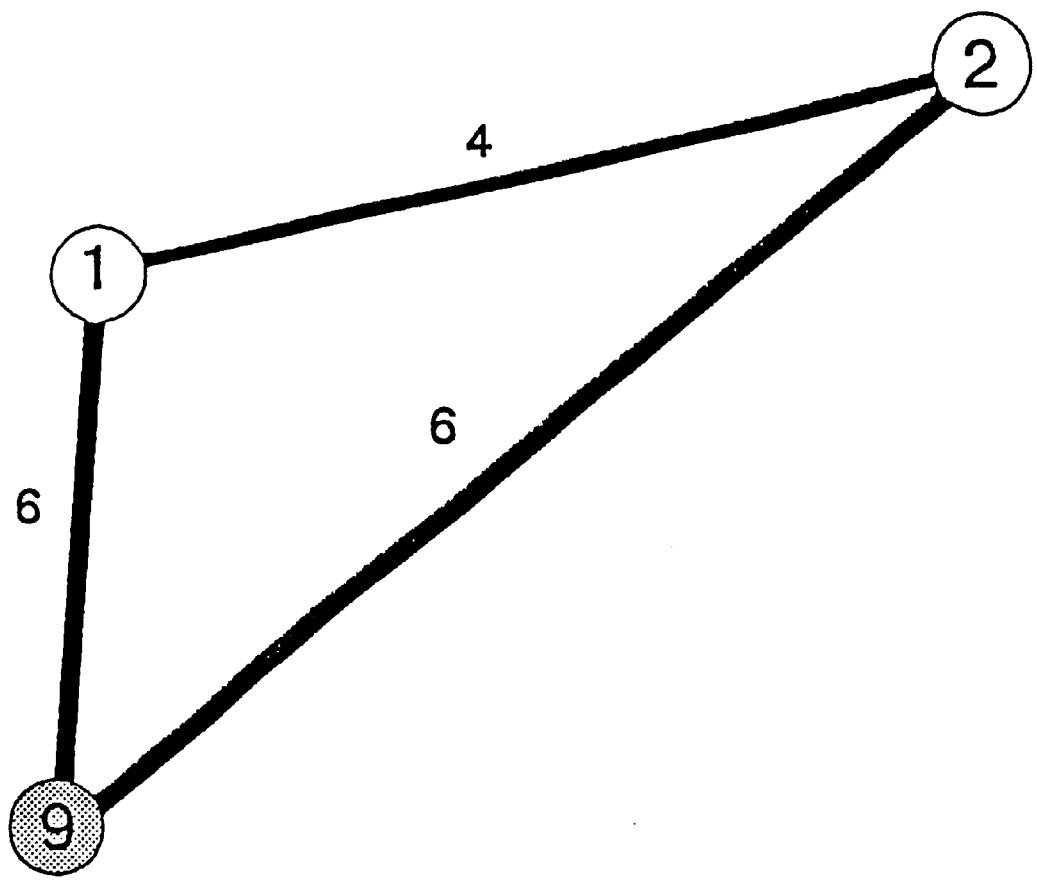
FIG. 10 is an example of a component of the integrated graph of FIG. 9.

One of options to provide the user with information about subgraphs of the integrated graph is a "scheme of interrelationship" (FIG. 10) presenting to the user the information on particular elements of user's profile and their relationship visually. For "scheme of interrelationship", relations coupling elements of user's profile are edges of a subgraph and a quantitative evaluation of a given relation is an edge's multiplicity.

INDUSTRIAL APPLICABILITY

The suggested methods can be utilized for achieving various practical results in different fields of use thereof, in particular:

in fields of administrating, financing—revealing relationships between different indexes describing a process or an object of the user's interest, leading, forecasting, revealing arising problems;

in a field of selfeducation—accelerated studying various materials on a complicated problem;

in libraries—selecting information materials taking into account the user's interest on subjects, express acquainting with abstracts of materials interesting for the user, creating special data bases including semantic abstracts of publications on definite subjects;

under creating systems for producing abstracts automatically in different languages.

What is claimed is:

1. A method for automatically processing information materials consisting of detecting, in the processed materials, data that can be described as relevant to a user, fixing the presence of said data, connecting said data to elements of information needed by the user, and using said elements and their combinations to provide the content of the processed materials to the user, comprising the steps of the processing is performed in an interactive way, by means of exhibiting sequentially separated sense fragments on which the information materials that are being processed are subdivided as to types of fragments subdivided, and demonstrating said elements of the information needed by the user in visual or audiovisual forms, said processing detecting whether a sense relationship exists between the content of a defined fragment or different other relationships of the given fragments, and in the case that a sense relationship is detected between the content of one specific fragment and one or another element of the user's information need, fixing the existence of said relationship by generating an individual feature for each of the elements in which the relationship is detected, and in the case that a relationship of a different order of one given fragment to different elements of the information needed by the user is detected, generating the features of said elements to a variety of levels or orders in accordance with the number of detected grades in the relationship, after which an image of a local structure is formed, wherein said structure is related to the given fragment of structure and is represented as a marked, connected, undirected graph having nodes to which elements of the information need of the user, an information need that has created the features of relations and content in such graph, are assigned, said nodes having higher nodes and lower nodes, said graph being fully connected, and in the case that no single one of the elements of the information need of the user is dominating but rather the features that indicated these elements belong to different levels in accordance with detected differences in the density of their relationship to the content of the given fragment, then each of the higher nodes being coupled with all of the lower nodes, and in the case of the existence of more than one node at the highest level, each of said nodes being also coupled with the others, and, after completing the formation of an image of the local structure for the last fragment of material to be processed, generating an image of an integrated graph by means of the logical additions of graphs all of which present local structures with equal multiple edges, and reflecting the result of this processing in a visual form by manipulating the multiple edges, geometrical images, sizes and colors and by a digital indication of the multiplicity of edges in the integrated graph that is obtained, as a whole or in separate components, as an indicator of the degree in the mutual relationship of a particular problem in matching up materials to the elements of the information need of the user, to which the nodes of the integrated graph correspond.

2. A method for automatically processing information materials consisting of detecting, in the processed materials, data that can be described as relevant to a user, fixing the presence of said data, connecting said data to elements of information needed by the user, and using said elements and their combinations to provide the content of the processed materials to the user, comprising the steps of the processing is performed in an interactive way, by means of exhibiting sequentially separated sense fragments on which the information materials that are being processed are subdivided as to types of fragments subdivided, and demonstrating said elements of the information needed by the user in visual or audiovisual forms, said processing detecting whether a sense relationship exists between the content of a defined fragment or different other relationships of the given fragments, assigning elements of the information need of the user, by which the features of the existence and relationships within the given fragment are formed, to nodes of a graph, where at least one structure of a set is characterized by the presence of a dominating element, selecting a local structure, wherein said structure is related to the given fragment, from the set, a local structure that is most fitted to this fragment, fixing, as features of said selected structure, a collection of features from the material that identify the elements characteristic of the information need of the user with corresponding nodes of this structures and with edges that connect said nodes, completing the generation of an image of the local structure for the last fragment of the materials being processed, and thereafter generating an image of an integrated graph by the logical addition of graphs that present local structures with equal multiple edges, then reflecting the result of the processing in visual form by manipulating the multiple edges with geometric images, sizes and color, which correspond to the multiplicity thereof and with digital indications of the multiplicity of edges in the obtained integrated graph, as a whole or in the separate components thereof, as an indicator of the degree of mutual relationships between the problem for matching up the elements of the information needed by the user, relationships to which the nodes of the integrated graph correspond.

3. A method for automatically processing information materials consisting of detecting, in the processed materials, data that can be described as relevant to a user, fixing the presence of said data, connecting said data to elements of information needed by the user, and using said elements and their combinations to provide the content of the processed materials to the user, comprising the steps of the processing is performed in an interactive way, by means of exhibiting sequentially separated sense fragments on which the information materials that are being processed are subdivided as to types of fragments subdivided, and demonstrating said elements of the information needed by the user in visual or audiovisual forms, said processing detecting whether a sense relationship exists between the content of a defined fragment or different other relationships of the given fragments, and in the case that a sense relationship is detected between the content of one specific fragment and one or another element of the user's information need, fixing the existence of said relationship by generating an individual feature for each of the elements in which the relationship is detected, and in the case that a relationship of a different order of one given fragment to different elements of the information needed by the user is detected, generating the features of said elements to a variety of levels or orders in accordance with the number of detected grades in the relationship, after which an image of a local structure is formed, wherein said structure is related to the given fragment of structure and is represented as a marked, connected, undirected graph having nodes to which elements of the information need of the user, an information need that has created the features of relations and content in such graph, are assigned, said nodes having higher nodes and lower nodes, completing generation of an image of the local structure for the last fragment of the materials being processed, and thereafter generating an image of an integrated graph by the logical addition of graphs that present local structures with equal multiple edges, then reflecting the result of the processing in visual form by manipulating the multiple edges with geometric images, sizes and color, which correspond to the multiplicity thereof and with digital indications of the multiplicity of edges in the obtained integrated graph, as a whole or in the separate components thereof, as an indicator of the degree of mutual relationships between the problem for matching up the elements of the information needed by the user, relationships to which the nodes of the integrated graph correspond.

4. A method for automatically processing information materials consisting of detecting, in the processed materials, data that can be described as relevant to a user, fixing the presence of said data, connecting said data to elements of information needed by the user, and using said elements and their combinations to provide the content of the processed materials to the user, comprising the steps of the processing is performed in an interactive way, by means of exhibiting sequentially separated sense fragments on which the information materials that are being processed are subdivided as to types of fragments subdivided, and demonstrating said elements of the information needed by the user in visual or audiovisual forms, said processing detecting whether a sense relationship exists between the content of a defined fragment or different other relationships of the given fragments, and in the case that a sense relationship is detected between the content of one specific fragment and one or another element of the user's information need, fixing the existence of said relationship by generating an individual feature for each of the elements in which the relationship is detected, and in the case that a relationship of a different order of one given fragment to different elements of the information needed by the user is detected, generating the features of said elements to a variety of levels or orders in accordance with the number of detected grades in the relationship, after which an image of a local structure is formed, wherein said structure is related to the given fragment of structure and is represented as a marked, connected, undirected graph having nodes to which elements of the information need of the user, an information need that has created the features of relations and content in such graph, are assigned, said nodes having higher nodes and lower nodes, completing generation of an image of the local structure for the last fragment of the materials being processed, and thereafter generating an image of an integrated graph by the logical addition of graphs that present local structures with equal multiple edges, then reflecting the result of the processing in visual form by manipulating the multiple edges with geometric images, sizes and color, which correspond to the multiplicity thereof and with digital indications of the multiplicity of edges in the obtained integrated graph, as a whole or in the separate components thereof, as an indicator of the degree of mutual relationships between the problem for matching up the elements of the information needed by the user, relationships to which the nodes of the integrated graph correspond, defining the frequencies of occurrence of various local structures with differing numbers of elements of the information needed by the user included within them, and reflecting the values of these frequencies and forms in the corresponding local structure.

5. A method for automatically processing information materials consisting of detecting, in the processed materials, data that can be described as relevant to a user, fixing the presence of said data, connecting said data to elements of information needed by the user, and using said elements and their combinations to provide the content of the processed materials to the user, comprising the steps of the processing is performed in an interactive way, by means of exhibiting sequentially separated sense fragments on which the information materials that are being processed are subdivided as to types of fragments subdivided, and demonstrating said elements of the information needed by the user in visual or audiovisual forms, said processing detecting whether a sense relationship exists between the content of a defined fragment or different other relationships of the given fragments, assigning elements of the information need of the user, by which the features of the existence and relationships within the given fragment are formed, to nodes of a graph, where at least one structure of a set is characterized by the presence of a dominating element, selecting a local structure, wherein said structure is related to the given fragment, from the set, a local structure that is most fitted to this fragment, fixing, as features of said selected structure, a collection of features from the material that identify the elements characteristic of the information need of the user with corresponding nodes of this structures and with edges that connect said nodes, completing generation of an image of the local structure for the last fragment of the materials being processed, and thereafter generating an image of an integrated graph by the logical addition of graphs that present local structures with equal multiple edges, then reflecting the result of the processing in visual form by manipulating the multiple edges with geometric images, sizes and color, which correspond to the multiplicity thereof and with digital indications of the multiplicity of edges in the obtained integrated graph, as a whole or in the separate components thereof, as an indicator of the degree of mutual relationships between the problem for matching up the elements of the information needed by the user, relationships to which the nodes of the integrated graph correspond, defining the frequencies of occurrence of various local structures with differing numbers of elements of the information needed by the user included within them, and reflecting the values of these frequencies and forms in the corresponding local structure.

6. A method for automatically processing information materials consisting of detecting, in the processed materials, data that can be described as relevant to a user, fixing the presence of said data, connecting said data to elements of information needed by the user, and using said elements and their combinations to provide the content of the processed materials to the user, comprising the steps of the processing is performed in an interactive way, by means of exhibiting sequentially separated sense fragments on which the information materials that are being processed are subdivided as to types of fragments subdivided, and demonstrating said elements of the information needed by the user in visual or audiovisual forms, said processing detecting whether a sense relationship exists between the content of a defined fragment or different other relationships of the given fragments, and in the case that a sense relationship is detected between the content of one specific fragment and one or another element of the user's information need, fixing the existence of said relationship by generating an individual feature for each of the elements in which the relationship is detected, and in the case that a relationship of a different order of one given fragment to different elements of the information needed by the user is detected, generating the features of said elements to a variety of levels or orders in accordance with the number of detected grades in the relationship, after which an image of a local structure is formed, wherein said structure is related to the given fragment of structure and is represented as a marked, connected, undirected graph having nodes to which elements of the information need of the user, an information need that has created the features of relations and content in such graph, are assigned, said nodes having higher nodes and lower nodes, completing the generation of an image of the local structure for the last fragment of the materials being processed, and thereafter generating an image of an integrated graph by the logical addition of graphs that present local structures with equal multiple edges, then reflecting the result of the processing in visual form by manipulating the multiple edges with geometric images, sizes and color, which correspond to the multiplicity thereof and with digital indications of the multiplicity of edges in the obtained integrated graph, as a whole or in the separate components thereof, as an indicator of the degree of mutual relationships between the problem for matching up the elements of the information needed by the user, relationships to which the nodes of the integrated graph correspond, defining the frequencies of occurrence of various local structures with differing numbers of elements of the information needed by the user included within them, and reflecting the values of these frequencies and forms in the corresponding local structure.

* * * * *